(12) United States Patent
Chamberlain

(10) Patent No.: US 7,891,688 B2
(45) Date of Patent: Feb. 22, 2011

(54) BICYCLE FRAME WITH ARTICULATING LINKAGE MOUNTING ARRANGEMENT

(75) Inventor: Jason L. Chamberlain, Morgan Hill, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 44 days.

(21) Appl. No.: 12/400,660

(22) Filed: Mar. 9, 2009

(65) Prior Publication Data

US 2010/0225089 A1 Sep. 9, 2010

(51) Int. Cl.
*B62K 3/00* (2006.01)

(52) U.S. Cl. ..................... 280/281.1; 280/284

(58) Field of Classification Search ................. 280/284, 280/281.1, 124.134, 283
See application file for complete search history.

(56) References Cited

U.S. PATENT DOCUMENTS

| | | | |
|---|---|---|---|
| 5,628,524 A | 5/1997 | Klassen et al. | |
| 5,957,473 A | 9/1999 | Lawwill | |
| 6,843,494 B2 | 1/2005 | Lam | |
| 7,048,292 B2 | 5/2006 | Weagle | |
| 7,140,628 B2 | 11/2006 | Parkin | |
| 7,377,535 B2 * | 5/2008 | Chamberlain | 280/284 |
| 7,413,208 B2 * | 8/2008 | Weng | 280/284 |
| 2003/0193163 A1 * | 10/2003 | Chamberlain et al. | 280/284 |
| 2004/0061305 A1 | 4/2004 | Christini | |
| 2005/0253357 A1 * | 11/2005 | Chang et al. | 280/283 |
| 2006/0119070 A1 * | 6/2006 | Weagle | 280/284 |
| 2008/0054595 A1 * | 3/2008 | Lu | 280/284 |
| 2008/0067772 A1 * | 3/2008 | Weagle | 280/124.134 |
| 2009/0001685 A1 * | 1/2009 | Talavasek et al. | 280/281.1 |
| 2009/0072512 A1 * | 3/2009 | Earle | 280/283 |
| 2009/0261557 A1 * | 10/2009 | Beale et al. | 280/284 |

* cited by examiner

*Primary Examiner*—Joanne Silbermann
*Assistant Examiner*—Tashiana Adams
(74) *Attorney, Agent, or Firm*—Knobbe, Martens, Olson & Bear, LLP

(57) ABSTRACT

A bicycle frame assembly includes an articulating linkage mounting arrangement that fixedly couples one or more lever arms to a rotatable axle. A preferred embodiment includes at least one lever arm, and preferably a pair of lever arms. The lever arm or arms are fixedly coupled to an axle by a fastener having a fastener axis that is eccentric to, or offset from, the axis of rotation of the axle. Accordingly, relative rotation of the lever arm and axle is prevented such that the axle and lever arm rotate together as a unit.

20 Claims, 6 Drawing Sheets

BICYCLE FRAME WITH ARTICULATING LINKAGE MOUNTING ARRANGEMENT

BACKGROUND OF THE INVENTION

1. Field of the Invention

The present invention relates to bicycle frame assemblies. In particular, the present invention relates to a mounting arrangement for an articulating linkage, such as a link component of a rear suspension assembly.

2. Description of the Related Art

A common rear suspension arrangement for a bicycle frame assembly includes an articulating sub-frame having a lever assembly or link that couples a portion of the sub-frame to a main frame of the bicycle frame assembly. The link may also support one end of a shock absorber operably coupled between the main frame and the sub-frame. The link often includes a pair of lever arms, which are spaced from one another in a lateral direction and interconnected by a crossbar portion such that the lever arms move together as a unit. However, a disadvantage of such an arrangement is that a clearance space must be provided to accommodate the crossbar portion throughout the range of movement of the link during articulation of the sub-frame. Such an arrangement can place limitations on the design of the remainder of the frame assembly. For example, sometimes the seat tube is provided in two distinct portions with an interrupted intermediate section, which provides a clearance space to accommodate movement of the link.

In other arrangements, the lever arms may be fixedly coupled to an axle that is supported for rotation relative to the main frame. Two such arrangements include a pinch clamp connection and a splined connection. In the pinch clamp connection, a portion of the lever arm surrounding the axle is provided with a radial slot. A fastener couples portions of the lever arm on each side of the radial slot and is tightened to reduce the width of the slot and clamp the lever arm to the axle. However, with such an arrangement, the clamp force is not evenly distributed around the circumference of the axle. Moreover, it may be difficult to provide enough retention force to prevent relative rotation between the lever arm and the axle without resorting to an overbuilt and unsightly construction. A splined connection between the lever arms and the axles is satisfactory at preventing relative rotation between the components, but is expensive to manufacture due to the processes required to produce the splines and the precision required to match the rotational position of the lever arm on each side of the axle.

SUMMARY OF THE INVENTION

One or more embodiments of the present articulating linkage mounting arrangement fixedly couple one or more lever arms to a rotatable axle in a manner that is cost-effective to manufacture and the may overcome one or more of the drawbacks of the prior art designs described above. A preferred embodiment may include a lever arm that is fixedly coupled to an axle by a fastener having a fastener axis that is eccentric to, or offset from, the axis of rotation of the axle. Accordingly, relative rotation of the lever arm and axle is prevented such that the axle and lever arm rotate together as a unit.

A preferred embodiment involves a bicycle frame including a main frame portion, which includes a bottom bracket configured to support a pedal crank assembly for rotation relative to said main frame portion. The main frame portion also includes a head tube configured to support a front fork for rotation relative to said main frame portion. The main frame portion further includes an opening defining an axis of rotation. The bicycle frame also includes an articulating frame portion, which includes a chain stay portion coupled for articulation relative to the main frame portion, a seat stay portion coupled to the chain stay portion and a lever portion coupled for articulation relative to the seat stay portion. The lever portion is coupled to the main frame portion for rotation about the axis of rotation. The lever portion includes a first lever arm, a second lever arm and an axle. The axle is supported by the main frame for rotation about the axis of rotation. The first lever arm is coupled to the axle by a first fastener having a first fastener axis that is substantially parallel to and offset from the axis of rotation. The second lever arm is coupled to the axle by a second fastener having a second fastener axis that is substantially parallel to and offset from the axis of rotation such that the first lever arm, the second lever arm and the axle rotate together as a unit about the axis of rotation. A shock absorber is operably coupled between the articulating frame portion and the main frame portion.

A preferred embodiment involves a bicycle frame, including a main frame portion and an articulating frame portion. The main frame portion includes a bottom bracket configured to support a pedal crank assembly for rotation relative to the main frame portion and a head tube configured to support a front fork for rotation relative to the main frame portion. The main frame portion further includes an opening defining an axis of rotation. The articulating frame portion includes a lever portion and an axle. The axle is supported by the main frame for rotation about the axis of rotation. The lever portion defines a first opening and the axle defines a second opening. The first and second openings are aligned with one another when the lever portion is assembled to the axle. A fastener extends through both the first opening and the second opening and secures the lever portion to the axle such that the lever portion and the axle rotate together as a unit about the axis of rotation. The fastener has a fastener axis that is offset from the axis of rotation such that force transferred between the lever portion and the axle during rotation of the articulating frame portion is applied as a shear force to the fastener. A shock absorber is operably coupled between the articulating frame portion and the main frame portion.

A preferred embodiment involves a bicycle frame, including a main frame portion and an articulating frame portion. The main frame portion includes a bottom bracket configured to support a pedal crank assembly for rotation relative to the main frame portion and a head tube configured to support a front fork for rotation relative to the main frame portion. The main frame portion further includes an opening defining an axis of rotation. The articulating frame portion includes a first lever portion, a second lever portion and an axle, wherein the axle is supported by the main frame for rotation about the axis of rotation. A first fastener extends through the first lever portion and into the axle. The first fastener defines a first fastener axis that is offset from the axis of rotation. A second fastener extends through the second lever portion and into the axle. The second fastener defines a second fastener axis that is offset from the axis of rotation. The first and second lever portions and the axle rotate together as a unit about the axis of rotation. A shock absorber is operably coupled between the articulating frame portion and the main frame portion.

A preferred embodiment involves an assembly including a bicycle wheel having a hub. The hub defines an opening defining an axis of rotation. An axle is positioned within the hub and supports the hub for rotation about the axis of rotation. The axle is coupled to a wheel support portion of a bicycle at a first end by a first fastener, which defines a first fastener axis that is offset from the axis of rotation. The axle is coupled to the wheel support portion of the bicycle at a second end by a second fastener, which defines a second fastener axis that is offset from the axis of rotation. Accordingly, relative rotation between the axle and the wheel support portion of the bicycle is prevented. The axle may be a front or rear wheel axle and the wheel support portion may be a front fork assembly or a frame of the bicycle.

BRIEF DESCRIPTION OF THE DRAWINGS

These and other features, aspects and advantages are described below with reference to drawings of preferred embodiments, which are intended to illustrate but not to limit the present invention. The drawings contain six (6) figures.

DETAILED DESCRIPTION OF THE PREFERRED EMBODIMENTS

Figure 1:
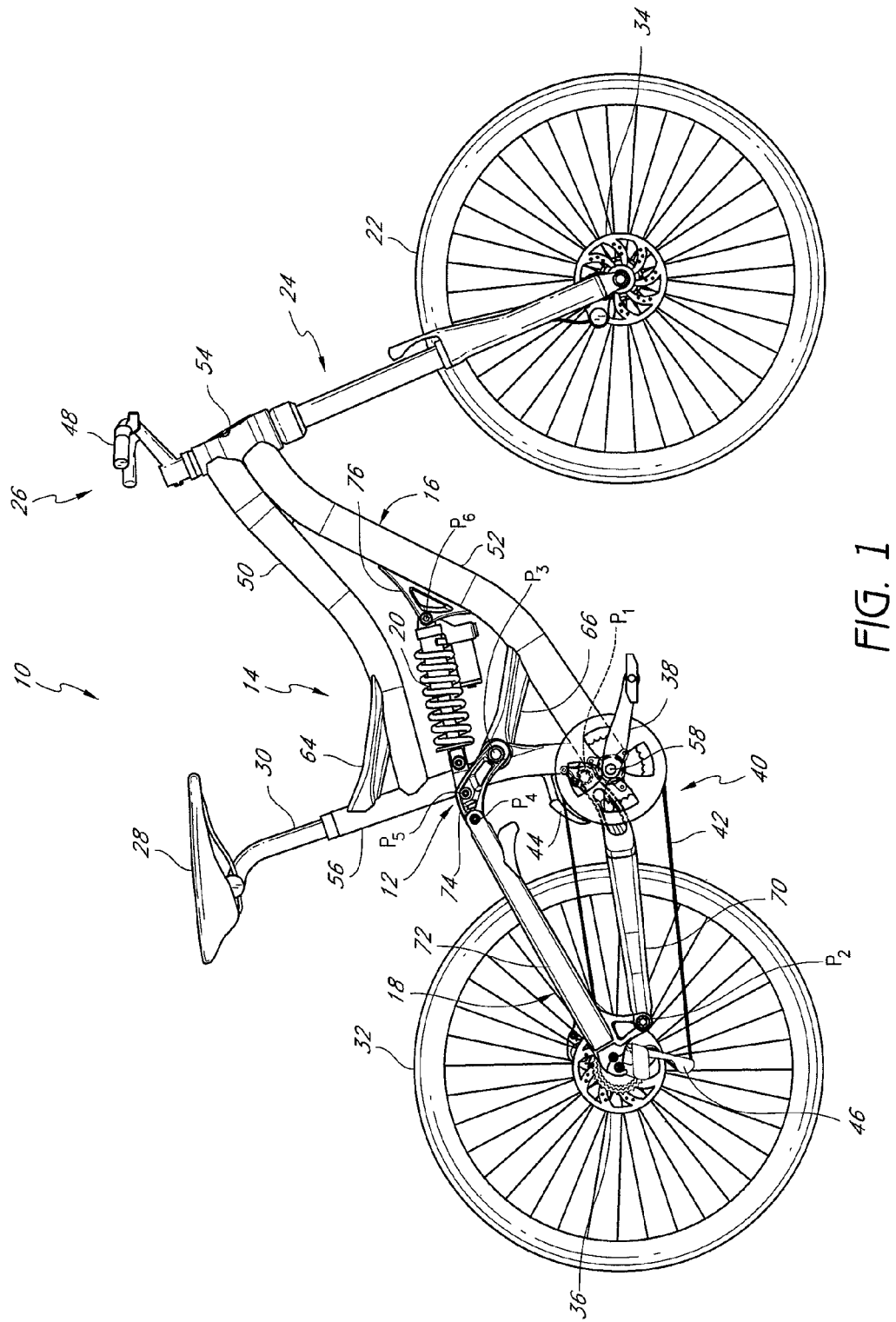
FIG. 1 is an elevation view of a bicycle incorporating a frame assembly including a linkage mounting assembly having certain features, aspects and advantages of the present invention.

FIG. 1 illustrates a bicycle 10 including an articulating linkage mounting assembly having certain features, aspects and advantages of preferred embodiments of the present invention. The overall bicycle 10 is described in general detail to assist in the understanding of certain beneficial features and advantages of the illustrated embodiment of the articulating linkage mounting assembly 12. Details of the bicycle 10 that are not described herein may be assumed to be of a conventional construction or a suitable alternative construction, as will be appreciated by one of skill in the art. Although the present articulating linkage mounting assembly is described herein with respect to a bicycle application, it is contemplated that the mounting assembly may be adapted for use with other vehicles incorporating shock absorbers, such as motorcycles or automobiles, for example.

The bicycle 10 includes a frame assembly 14 which, preferably, includes a main frame portion 16 and an articulating frame portion or sub-frame portion 18. The sub-frame 18 is moveable relative to the main frame 16. Movement of the sub-frame 18 relative to the main frame 16 is influenced by a shock absorber 20, which is operably connected between the main frame 16 and the sub-frame 18.

A front wheel 22 of the bicycle is supported relative to the frame 14 by a front suspension assembly 24 which, in the illustrated arrangement, is a front suspension fork. The suspension fork 24 is rotatably supported by a forward end of the frame assembly 14 so that the front wheel 22 may be rotated about a steering axis. A handlebar assembly 26 is coupled to an upper end of the front suspension fork 24 to permit a rider of the bicycle 10 to steer the front wheel 22.

A seat 28 is supported on a seat post 30, which extends in an upward direction from an intermediate portion of the frame assembly 14. The seat post 30 may be adjustable relative to the frame assembly 14 to permit adjustment of a height of the seat 28.

A rear wheel 32 is rotatably supported by the sub-frame 18. Thus, the rear wheel 32 is moveable relative to the main frame 16 along with the sub-frame 18. Accordingly, impacts imparted to the rear wheel 32 desirably are at least somewhat attenuated by the shock absorber 20 before reaching a rider of the bicycle 10.

The front and rear wheels 22, 32 include front and rear brakes 34, 36, respectively. The brakes 34, 36 are configured to selectively apply a force tending to slow or stop rotation of the front or rear wheel 22, 32. The illustrated brakes 34, 36 are disc brakes, including a generally circular brake rotor and a caliper. However, other suitable types of brake systems may also be used, such as rim brakes, which apply a squeezing force to a rim of the wheel 22 or 32, for example.

In the illustrated arrangement, the rear wheel 32 is driven by a pedal crank assembly 38 through a chain and sprocket drive arrangement 40. The pedal crank assembly 38 is rotatably support by the frame assembly 14 and supports a plurality of different sized gears, or chain rings, for rotation along with the pedal crank 38. A plurality of different sized gears, or cogs (not shown), are supported on a central hub of the rear wheel 36. A drive chain 42 interconnects a selected one of the chain rings with a selected one of the cogs such that the rear wheel 32 may be rotated along with forward rotation of the pedal crank 38. In the illustrated arrangement, the pedal crank 38 is supported within a bottom bracket of the main frame portion 16; however, other arrangements are possible in which the bottom bracket is not a portion of the main frame. For example, the bottom bracket may be a part of the articulating frame portion in some arrangements.

The drive chain 42 may be moved into engagement with a selected one of the chain rings and cogs by a front derailleur and a rear derailleur 44, 46 respectively. Although a multi-speed, chain drive arrangement 40 is preferred, other suitable types of drive train arrangements may also be used. Desirably, operator controls 48 are provided on one or both sides of the handlebar assembly 26 to permit a rider of the bicycle 10 to control the front and rear brakes 34, 36 and front and rear derailleurs 44, 46.

As described above, the frame assembly 14 includes a main frame portion 16 and a sub-frame portion 18. Preferably, the sub-frame 18 is moveable relative to the main frame 16. In one arrangement, each of the main frame 16 and sub-frame 18 are constructed as an assembly of individual pieces. Generally, the main frame 16 and sub-frame 18 will be constructed from individual, metal tubular members that are welded together. However, other suitable materials and manufacturing processes may also be used. For example, in some arrangements, all or part of the main frame 16 or sub-frame 18 may be constructed from a composite material in one or more pieces, for example. In addition, a combination of different materials may be used to construct one or both of the main frame 16 and sub-frame 18, such as a combination of a metal material (e.g., aluminum, steel, titanium) and a composite material (e.g., carbon fiber).

In the illustrated arrangement, the main frame 16 includes a top tube 50 and a down tube 52 which extend between a forward end and a rearward end of the main frame 16. Preferably, forward ends of the top tube 50 and down tube 52 are joined to a head tube 54, which rotatably supports the suspension fork 24. Desirably, the top tube 50 and down tube 52 also contact one another along a distance rearward of the head tube 54 to create an advantageously high strength junction.

A seat tube 56 extends in a generally vertical direction at or near a rearward end of the main frame 16 and, preferably, is connected to rearward ends of the top tube 50 and down tube 52. In the illustrated arrangement, the seat tube 56 is of a continuous construction. However, in other arrangements, the seat tube may be non-continuous and include an upper seat tube portion and a lower seat tube portion. The seat tube 56 supports the seat 28 and seat post 30. As described below, the seat tube 56 preferably supports at least a portion of the sub-frame 18. Desirably, at a junction between the down tube 52 and the lower portion 60 of the seat tube 56 is a bottom bracket shell 58, which supports the pedal crank assembly 38.

The main frame 16 may also include one or more additional structural members. For example, the main frame 16 includes a brace or strut 64 which extends between an upper surface of the top tube 50 and a forward surface of the upper portion of the seat tube 56. Desirably, the strut 64 reinforces an upper end of the upper portion of the seat tube 56. The main frame 16 also includes another brace or strut 66, which extends between an upper surface of the down tube 52 and an intermediate portion of the seat tube 56. Advantageously, the strut 66 provides additional support to the seat tube 56 against forces applied to the main frame 16 by the sub-frame 18.

As described above, the sub-frame 18 preferably is moveable relative to the main frame 16 and carries the rear wheel 32. In the illustrated arrangement, the sub-frame 18 is a multiple linkage assembly comprising multiple linkage members, two or more of which are pivotally coupled to one another. Such an arrangement advantageously permits a path of movement of the rear wheel 32 to be altered from the simple, arcuate movement which would occur with a single pivot arm rear suspension assembly.

The illustrated sub-frame 18 includes at least one and, preferably, a pair of chain stays 70, which are coupled for articulating motion relative to the main frame 16. In the illustrated arrangement, the chain stays 70 are coupled to the main frame 16 for rotation about a pivot axis $P_1$. However, in alternative arrangements, the chain stays 70 may be indirectly coupled to the main frame 16 by, for example, a linkage assembly including one or more linkage members. Preferably, each one of the pair of chain stays 70 extend along opposing sides of the rear wheel 32. The chain stays 70 may be interconnected, if desired. Alternatively, a single chain stay 70 may be provided on only one side of the rear wheel 32.

The sub-frame 18 preferably also includes at least one and, preferably, a pair of seat stays 72. The seat stays 72 are coupled to the chain stays 70 and, preferably, coupled to rearward end portions of the chain stays 70 for rotation about a pivot axis $P_2$ relative to the chain stays 70. Preferably, the rear wheel 32 is carried by the seat stays 72 for rotation about a hub axis $A_H$. However, in other arrangements, the rear wheel 32 may be supported by the chain stays 70 or another member of the sub-frame 18 linkage. As with the chain stays 70, the seat stays 72 may be interconnected at an upper or forward end, as shown. Alternatively, a single seat stay 72 may be provided.

Preferably, a lever structure, or link 74, interconnects an upper or forward end of the seat stays 72 with the main frame 16. The link 74 is also coupled to the main frame 16 and, preferably, to an intermediate portion of the seat tube 56, for rotation about a pivot axis $P_3$. In addition, the link 74 is configured for rotation relative to the seat stays 72 about a pivot axis $P_4$. Desirably, the link 74 includes a pair of spaced lever arm portions, which are interconnected by an axle, as described in greater detail below.

As will be appreciated by one of skill in the art, the relative lengths of the individual members of the sub-frame 18 and the relative positions of the pivot axes $P_1$-$P_4$ may be altered to achieve desired properties of the rear suspension assembly. In the illustrated arrangement, the pivot axis $P_1$ is positioned near, and preferably slightly above, the crank axis $A_c$. However, other positions of the pivot axis $P_1$ are also possible. Furthermore, preferably the pivot axis $P_2$ is positioned below the hub axis $A_h$. However, in other arrangements, the pivot axis $P_2$ may be aligned with or above the hub axis $A_h$. Furthermore, although the pivot axes P1-P4 described herein are illustrated as rotational connections between two or more members, it is also contemplated that a single member configured to flex at a specific location or region on the member may be utilized as well. Moreover, the rear suspension assembly may have a greater or lesser number of members and/or pivots than the arrangement shown and described herein.

Figure 2:
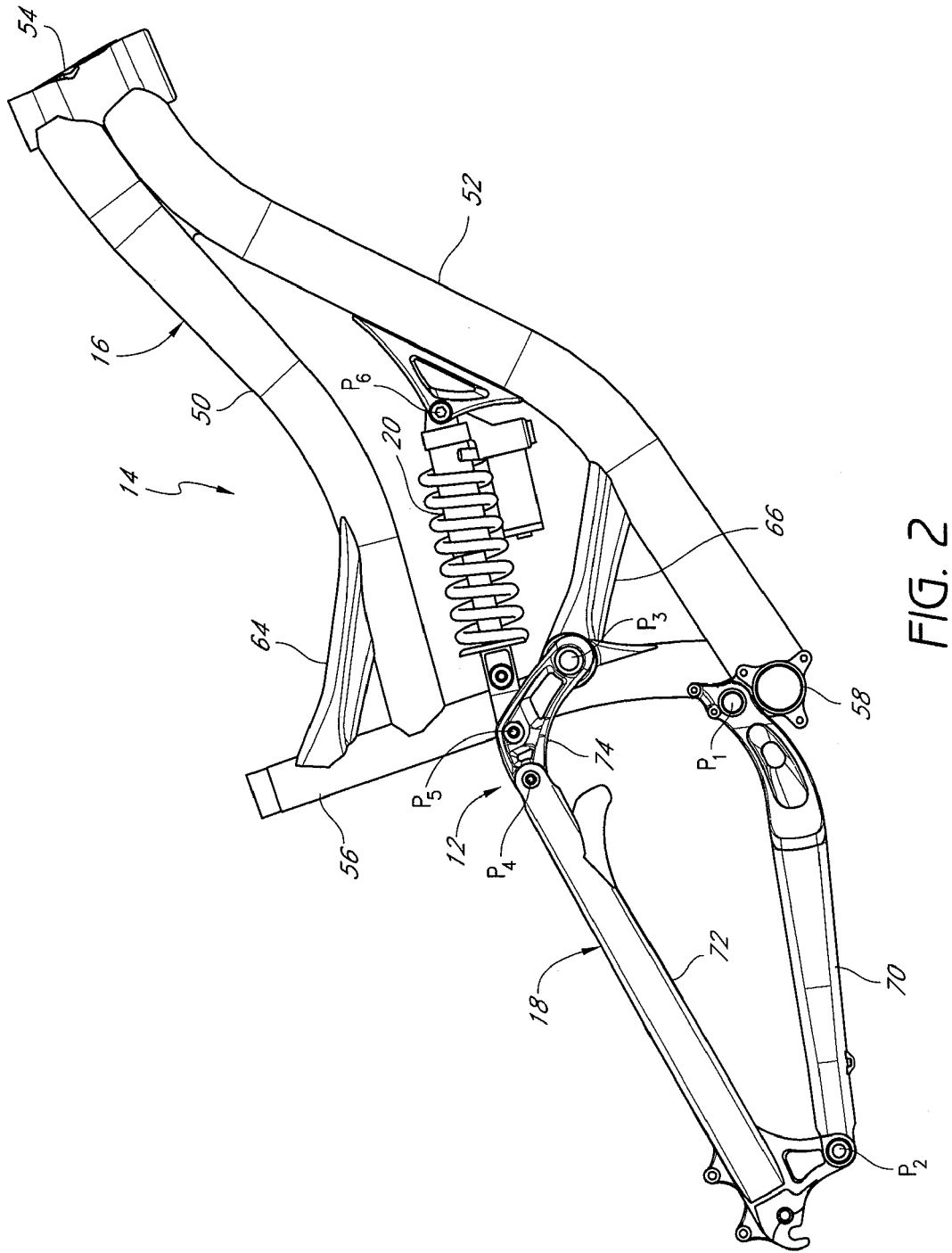
FIG. 2 is an elevation view of the frame assembly of the bicycle of FIG. 1.
Figure 3:
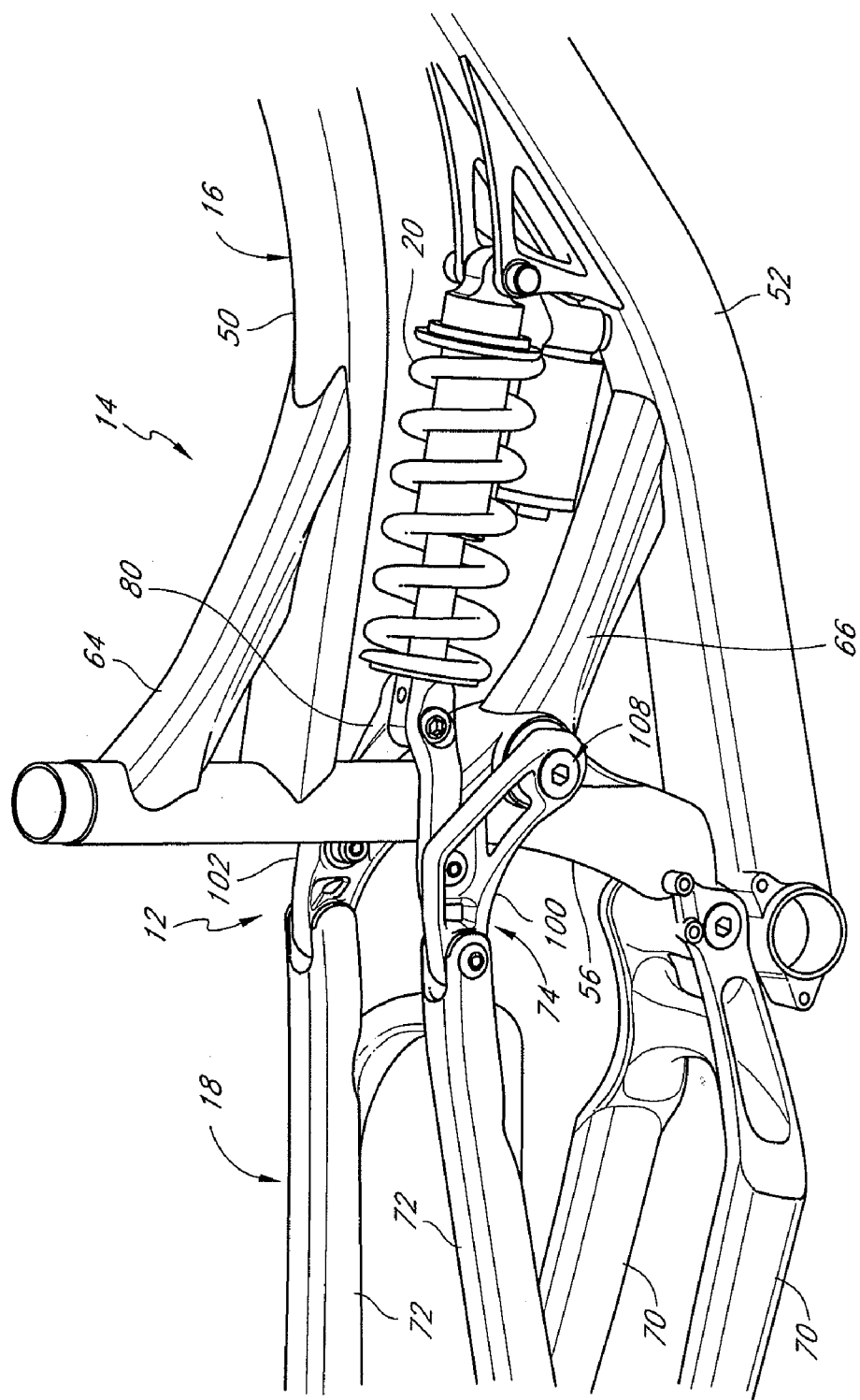
FIG. 3 is a perspective view of a portion of the frame assembly of the bicycle of FIG. 1 including the linkage mounting assembly.
Figure 4:
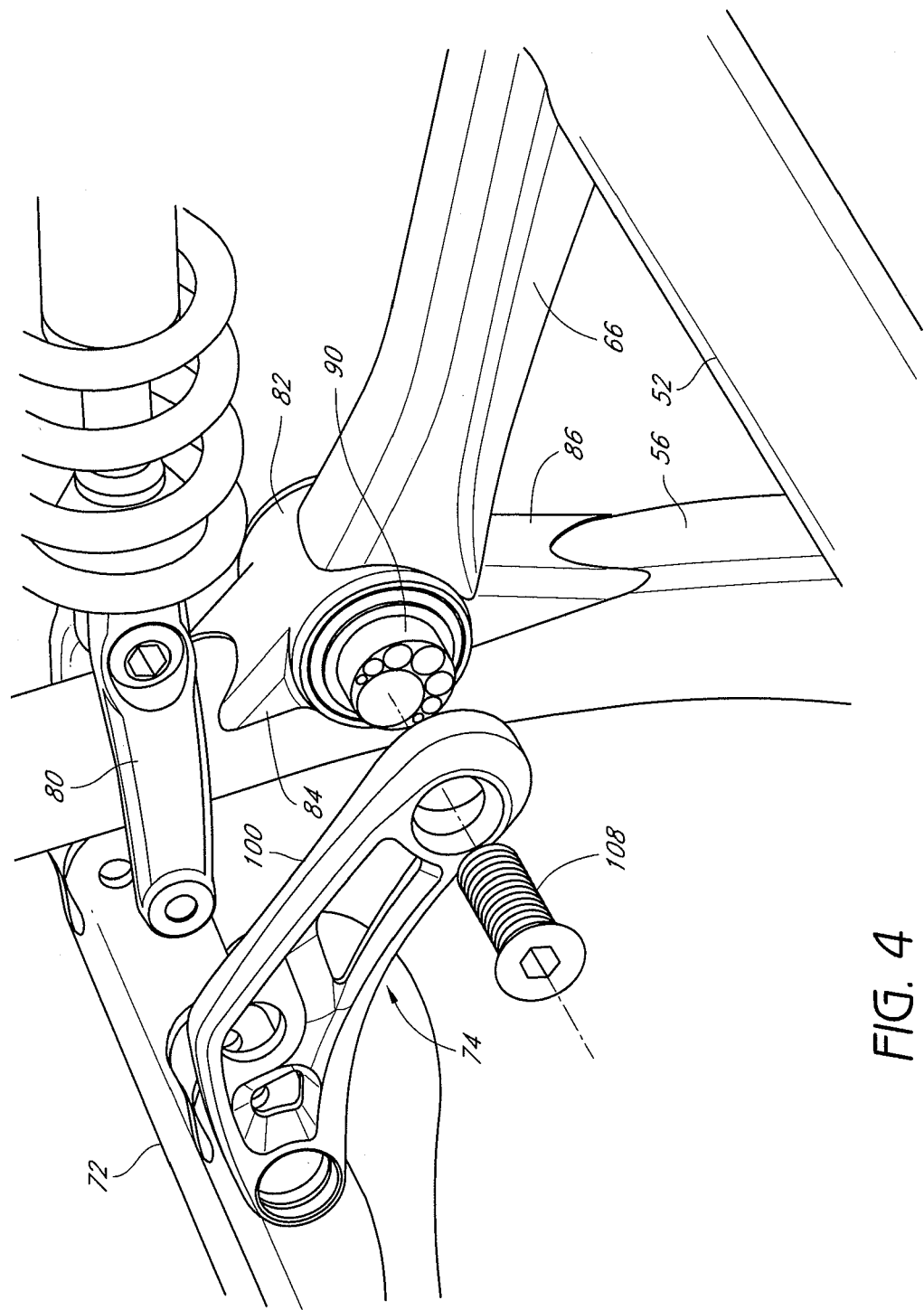
FIG. 4 is a perspective view of a portion of the frame assembly of the bicycle of FIG. 1 with a portion of the linkage mounting assembly shown in an exploded condition.

As described above, the shock absorber 20 preferably is operably connected between the main frame 16 and the sub-frame 18. In the illustrated arrangement, a rearward end of the shock absorber 20 is coupled to the sub-frame 18 at the pivot axis $P_5$, which is located on an intermediate portion of the link 74. However, in other arrangements, the shock absorber 20 may be connected to another portion of the link 74 or another component of the sub-frame 18. In the illustrated arrangement, the shock absorber 20 is coupled to the link 74 by a shock extension 80 (FIG. 2). The shock extension 80 is generally U-shaped and straddles the seat tube 56 such that the shock extension 80 is coupled to the shock absorber 20 forward of the seat tube 56 and coupled to the link 74 rearward of the seat tube 56 when the shock absorber 20 is in an extended position. The illustrated shock extension 80 includes two extension portions that are mirror images of one another. Each extension portion is coupled to one side of the shock absorber 20, extends along one side of the seat tube 56 and is coupled to the link 74.

A forward end of the shock absorber 20 preferably is coupled to the main frame 16 by a shock support bracket 76 for rotation about a pivot axis $P_6$. Preferably, the pivot axis $P_6$ is spaced slightly above the pivot axis $P_5$ so that the shock absorber 20 is relatively higher at a forward end than at a rearward end. In an alternative arrangement, the shock absorber 20 could be mounted between two members of the sub-frame 18 to influence movement of the sub-frame members relative to one another and, thus, relative to the main frame 16. Accordingly, it is contemplated that a shock absorber 20 may be operably connected between the main frame 16 and the sub-frame 18 without necessarily being physically connected to the main frame 16. In addition, a shock absorber being operably connected between the main frame 16 and the sub-frame would encompass other arrangements in which the shock absorber 20 is capable of influencing relative movement between the sub-frame 18 and the main frame 16.

As will be appreciated by one of skill in the art, the shock absorber 20 preferably is configured to provide both a spring force and a damping force. The shock absorber 20 includes a first portion 20a and a second portion 20b that are in telescopic engagement with one another. Thus, overall length of the shock absorber 20 varies throughout the range of travel of the shock absorber 20. The illustrated shock absorber 20 includes a coil spring and a fluid (e.g., incompressible liquid) damper, which may be of a suitable construction apparent to one of skill in the art. In other arrangements, other types of suitable spring (e.g., an air spring) and/or damper arrangements may be used.

As described above, the link 74 is coupled for rotation relative to the main frame 16. In the illustrated arrangement, the link 74 is coupled to a forward side of the seat tube 56 below the shock absorber 20. A support bracket or bearing support member 82 is coupled to the main frame 16 to rotatably support the link 74. Preferably, the bearing support member 82 is substantially cylindrical in shape and is positioned between the seat tube 56 and the strut 66. In addition, an upper gusset 84 and a lower gusset 86 provide support between upper and lower portions of the bearing support member 82, respectively, and the seat tube 56. The seat tube 56, strut 66, bearing support member 82, upper gusset 84 and lower gusset 86 can be constructed of a plurality of individual components assembled together (e.g., by welding) or can be constructed of one or more components created from a composite material, among other possible constructions apparent to one of skill in the art.

Figure 5:
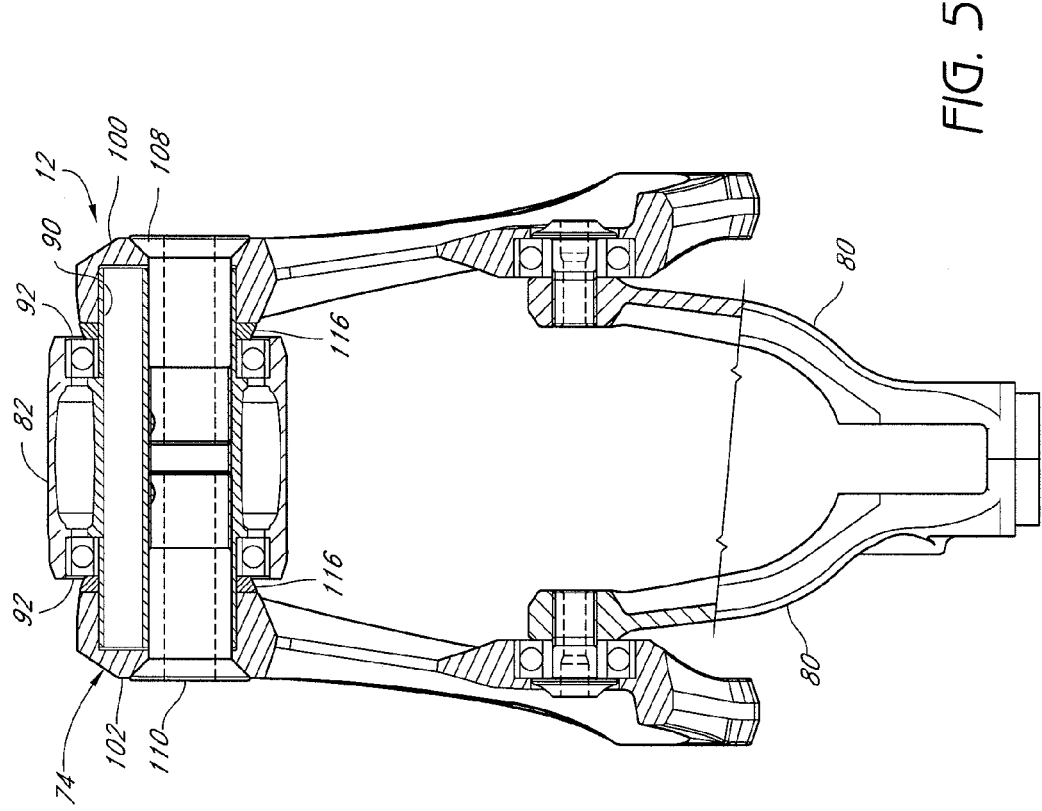
FIG. 5 is a partial cross-sectional view of a sub-frame portion of the frame assembly of the bicycle of FIG. 1.
Figure 6:
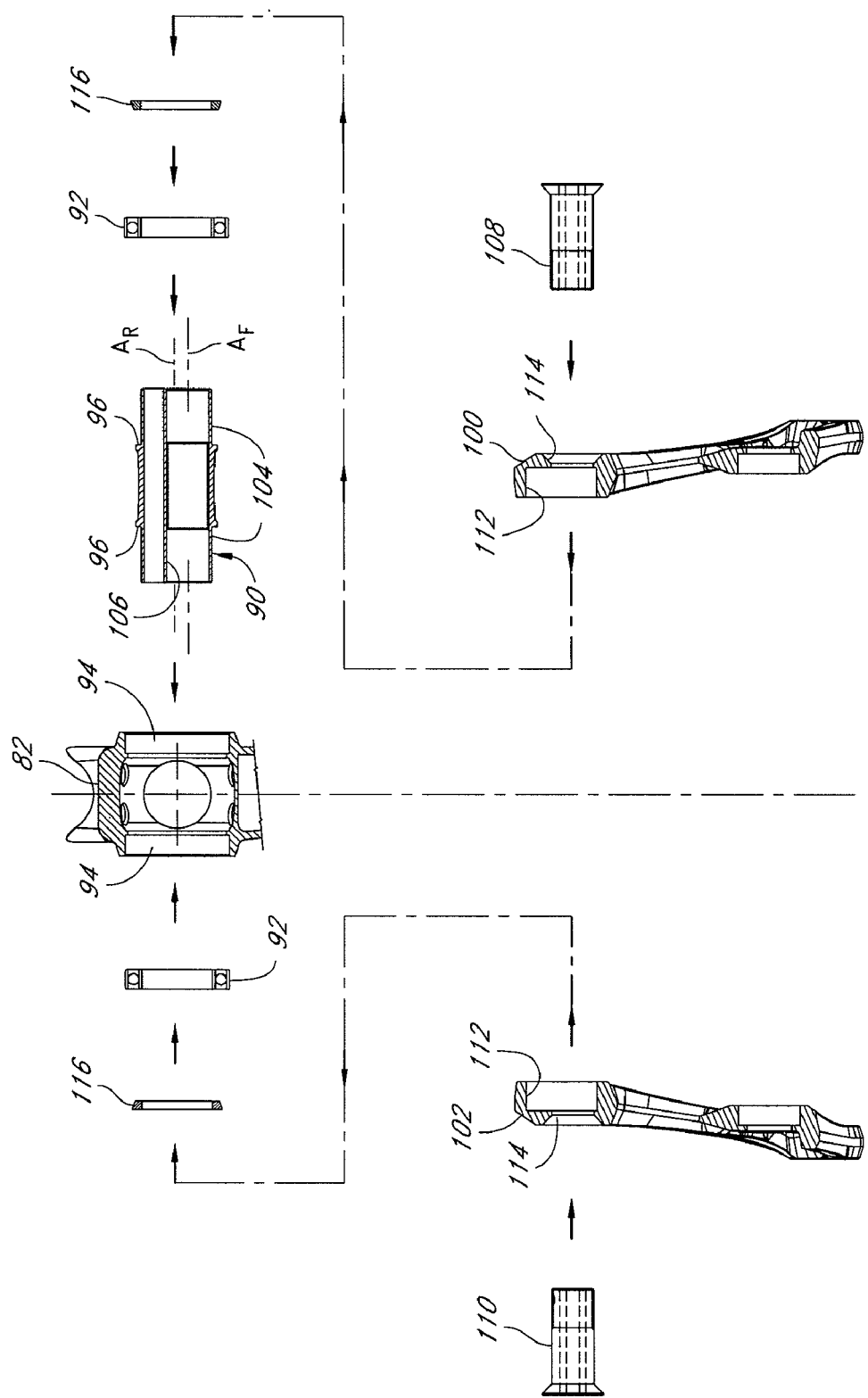
FIG. 6 is an assembly view of the linkage mounting assembly with a portion of the components shown in cross-section.

The bearing support member 82 rotatably supports an axle 90 of the link assembly 74. Preferably, the axle is generally cylindrical in outer shape and is supported within the bearing support member 82 by a pair of spaced apart bearings 92 (FIGS. 5 and 6). The bearings 92 reside in pockets 94 defined at each end of the bearing support member 82. The axle 90 defines shoulders 96 that correspond with the pockets 94 to define a stop surface for the bearings 92. Thus, preferably, inner surfaces of the pockets 94 are aligned with the shoulders 96 when the axle 90 is assembled within the bearing support member 82.

As described above, the link assembly 74 includes at least one lever arm and, in the illustrated arrangement, includes a first lever arm 100 and a second lever arm 102. The first lever arm 100 and the second lever arm 102 straddle the seat tube 56 and are fixedly coupled to the axle 90 such that the lever arms 100, 102 and the axle 90 rotate together as a unit. The first and second lever arms 100, 102 are also rotatably coupled to the shock extension 80 and the seat stays 72, as described above. In the illustrated arrangement, forward ends of the first and second lever arms 100, 102 are coupled to the axle 90 and rearward ends of the first and second lever arms 100, 102 are coupled to the seat stays 72. The shock extension 80 is coupled to an intermediate portion of each of the first and second lever arms 100, 102. Although the illustrated arrangement is presently preferred, other arrangements of the lever arms 100, 102 are possible in which the various components are coupled at different locations on the lever arms 100, 102 and the lever arms 100, 102 may be of a different length or shape (e.g., generally triangular).

As discussed above, the illustrated link assembly 74 has an advantageous arrangement for fixedly coupling the lever arms 100, 102 to one another, which overcomes certain limitations of prior art designs. Prior art designs often utilize a crossbar portion integrally formed with the right and left lever arms to fix the lever arms for rotation with one another. However, the crossbar portion can interfere with other components of the bicycle (e.g., the seat tube) and limit the possible configurations of the main frame and/or sub-frame, as well as the placement of the shock absorber. Other designs utilize a pinch clamp design or a splined connection to couple each lever arm with the rotational axle. However, the pinch clamp design can place uneven stress on the lever arms and axle and the splined connection is costly to manufacture.

A preferred link assembly 74 fixes the lever arms 100, 102 to the axle 90 using fasteners having a fastener axis that is eccentric to, or offset from, the axis of rotation of the axle 90. Such an arrangement provides a robust assembly that is cost-effective to manufacture. In the illustrated arrangement, the bearing surfaces 104 of the axle 90, adjacent the shoulders 96, define an axis of rotation $A_R$ of the axle 90. The axle 90 also includes a fastener cavity 106 that defines a fastener axis $A_F$. The fastener axis $A_F$ is offset from the axis of rotation $A_R$.

Preferably, the fastener axis $A_F$ is substantially parallel to the axis of rotation $A_R$ for ease of manufacture. However, other arrangements are possible in which the fastener axis $A_F$ is offset from, but not parallel to, the axis of rotation $A_R$. For example, the fastener axis $A_F$ could define an oblique angle with the axis of rotation $A_R$. The fastener cavity 106 preferably includes internal threads configured to engage external threads of fasteners 108 and 110. However, in alternative arrangements, other suitable types of fasteners may be used, such as press-fit or expanding fasteners, for example.

Preferably, the lever arms 100, 102 each define a pocket 112 configured to accommodate an end portion of the axle 90 such that the lever arms 100, 102 overlap and surround end portions of the axle 90. Thus, an axis defined by each of the pockets 112 is substantially coaxial with the axis of rotation $A_R$. The lever arms 100, 102 also include fastener openings 114 that are aligned with the pockets 112. However, an axis defined by each of the fastener openings is offset from the axis of the pockets 112 and is substantially coaxial with the fastener axis $A_F$. Preferably, the fastener openings 114 are chamfered to accommodate the tapered head portions of the fasteners 108, 110. In addition, optional annular spacers 116 may be positioned on the axle 90 and interposed between the lever arms 100, 102 and the bearings 94.

The illustrated arrangement provides a rigid and cost-effective link assembly 74. Furthermore, the illustrated link assembly 74 omits the external crossbar between the lever arms 100, 102, which could cause interference issues and, thus, limit the design options for the bicycle frame 14. Because the fasteners 108, 110 are offset from the axis of rotation $A_R$ of the axle 90, rotational forces applied to the link assembly 74 that attempt to rotate the lever arms 100, 102 relative to the axle 90 do not tend to rotate the fasteners 108, 110 about the fastener axis $A_F$ (thus tending to tighten or loosen the fastener). Rather, attempted rotation between the lever arms 100, 102 relative to the axle 90 tends to apply a shear force to the fasteners 108, 110. The fasteners 108, 110 can be appropriately sized in diameter (or cross-sectional size and shape) as appropriate to accommodate the expected shear forces. Moreover, the illustrated arrangement can be adapted for uses other than the link assembly 74. For example, other linkage members of the sub-frame portion 18 could be coupled in the same or a similar manner, such as the chain stays 70 and seat stays 72, for example, or additional linkage members not provided in the illustrated sub-frame 18. Moreover, it is contemplated that the disclosed eccentric fastener mounting arrangement could be applied in connecting a rear wheel axle to the bicycle frame or a front wheel axle to a front fork assembly, among other suitable applications apparent to one of skill in the art.

The link assembly 74 may be assembled by passing the axle 90 through the bearing support member 82. The bearings 92 can be positioned over opposite ends of the axle 90 and slid inboard (toward one another) into engagement with the inner surfaces of the pockets 94 and the shoulders 96. The optional spacers 116 can be placed over opposite ends of the axle 90 and slid inward towards the bearings 92. The lever arms 100, 102 can be assembled to opposite ends of the axle 90 with the axle 90 being received within the pockets 112. The fasteners 108, 110 can be passed through the fastener openings 114 of the lever arms 100, 102 and engaged with the axle 90. If threaded fasteners are used, a thread-locking agent or anti-seize compound may be used to inhibit or ease removal of the fasteners 108, 110, as may be appropriate.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In particular, while the present articulating linkage mounting assembly has been described in the context of particularly preferred embodiments, the skilled artisan will appreciate, in view of the present disclosure, that certain advantages, features and aspects of the mounting assembly may be realized in a variety of other applications, many of which have been noted above. Additionally, it is contemplated that various aspects and features of the invention described can be practiced separately, combined together, or substituted for one another, and that a variety of combination and subcombinations of the features and aspects can be made and still fall within the scope of the invention. Thus, it is intended that the scope of the present invention herein disclosed should not be limited by the particular disclosed embodiments described above, but should be determined only by a fair reading of the claims.

What is claimed is:

1. A bicycle frame, comprising:
   a main frame portion, said main frame portion comprising a bottom bracket configured to support a pedal crank assembly for rotation relative to said main frame portion and a head tube configured to support a front fork for rotation relative to said main frame portion, said main frame portion further comprising an opening defining an axis of rotation;
   an articulating frame portion, comprising:
   a chain stay portion coupled for articulation relative to said main frame portion;
   a seat stay portion coupled to said chain stay portion; and
   a lever portion coupled for articulation relative to said seat stay portion;
   wherein said lever portion is coupled to said main frame portion for rotation about said axis of rotation, said lever portion comprising a first lever arm, a second lever arm and an axle, said axle supported by said main frame for rotation about said axis of rotation, said first lever arm coupled to said axle by a first fastener extending through said first lever arm and into said axle, said first fastener having a first fastener axis that is substantially parallel to and offset from said axis of rotation, and said second lever arm coupled to said axle by a second fastener extending through said second lever arm and into said axle, said second fastener having a second fastener axis that is substantially parallel to and offset from said axis of rotation, said offset of said first fastener axis from said axis of rotation and said offset of said second fastener axis from said axis of rotation being sufficient, along with said coupling of said first and second lever arms to said axle, to cause said first lever arm, said second lever arm and said axle to rotate together as a unit about said axis of rotation; and
   a shock absorber operably coupled between said articulating frame portion and said main frame portion.

2. The bicycle frame of claim 1, wherein said first lever arm surrounds a first end portion of said axle and said second lever arm surrounds a second end portion of said axle.

3. The bicycle frame of claim 1, wherein said first fastener axis and said second fastener axis are aligned with one another.

4. The bicycle frame of claim 1, wherein said opening is defined by a bearing support member coupled to a seat tube of said main frame portion.

5. The bicycle frame of claim 4, further comprising a strut extending from a down tube of said main frame portion to said seat tube, wherein said bearing support member is coupled to said seat tube and said strut.

6. The bicycle frame of claim 1, wherein said seat stay portion is rotatably coupled to said chain stay portion.

7. The bicycle frame of claim 1, wherein said chain stay portion is directly coupled to said main frame portion.

8. A bicycle frame, comprising:
   a main frame portion, said main frame portion comprising a bottom bracket configured to support a pedal crank assembly for rotation relative to said main frame portion and a head tube configured to support a front fork for rotation relative to said main frame portion, said main frame portion further comprising an opening defining an axis of rotation;
   an articulating frame portion, comprising a lever portion and an axle, wherein said axle is supported by said main frame for rotation about said axis of rotation, said lever portion defining a first opening and said axle defining a second opening, said first and second openings being aligned with one another when said lever portion is assembled to said axle;
   a fastener that extends through both said first opening and said second opening and secures said lever portion to said axle, wherein said fastener has a fastener axis that is offset from said axis of rotation such that force transferred between said lever portion and said axle during rotation of said articulating frame portion is applied as a shear force to said fastener, said offset of said fastener axis from said axis of rotation being sufficient, along with said securing of said lever portion to said axle, to cause said lever portion and said axle rotate together as a unit about said axis of rotation; and
   a shock absorber operably coupled between said articulating frame portion and said main frame portion.

9. The bicycle frame of claim 8, wherein said lever portion surrounds an end portion of said axle.

10. The bicycle frame of claim 8, wherein said fastener is secured to said axle by a threaded connection.

11. The bicycle frame of claim 8, wherein said opening is defined by a bearing support member coupled to a seat tube of said main frame portion.

12. The bicycle frame of claim 11, further comprising a strut extending from a down tube of said main frame portion to said seat tube, wherein said bearing support member is coupled to said seat tube and said strut.

13. The bicycle frame of claim 8, wherein said articulating frame portion additionally comprises a chain stay portion and a seat stay portion.

14. The bicycle frame of claim 13, wherein said chain stay portion is directly coupled to said main frame portion.

15. A bicycle frame, comprising:
   a main frame portion, said main frame portion comprising a bottom bracket configured to support a pedal crank assembly for rotation relative to said main frame portion and a head tube configured to support a front fork for rotation relative to said main frame portion, said main frame portion further comprising an opening defining an axis of rotation;
   an articulating frame portion, comprising a first lever portion, a second lever portion and an axle, wherein said axle is supported by said main frame for rotation about said axis of rotation;

a first fastener that extends through said first lever portion and into said axle to couple said first lever portion to said axle, said first fastener defines a first fastener axis that is offset from said axis of rotation;

a second fastener that extends through said second lever portion and into said axle to couple said second lever portion to said axle, said second fastener defines a second fastener axis that is offset from said axis of rotation, wherein said offset of said first fastener axis from said axis of rotation and said offset of said second fastener axis from said axis of rotation is sufficient, along with said coupling of said first and second lever portions to said axle, to cause said first and second lever portions and said axle rotate together as a unit about said axis of rotation; and a shock absorber operably coupled between said articulating frame portion and said main frame portion.

16. The bicycle frame of claim 15, wherein said first lever portion surrounds a first end portion of said axle and said second lever portion surrounds a second end portion of said axle.

17. The bicycle frame of claim 15, wherein said first fastener axis and said second fastener axis are aligned with one another.

18. The bicycle frame of claim 15, wherein said opening is defined by a bearing support member coupled to a seat tube of said main frame portion.

19. The bicycle frame of claim 18, further comprising a strut extending from a down tube of said main frame portion to said seat tube, wherein said bearing support member is coupled to said seat tube and said strut.

20. The bicycle frame of claim 15, wherein said articulating frame portion additionally comprises a chain stay portion and a seat stay portion.

* * * * *